United States Patent [19]
Gautier et al.

[11] Patent Number: 5,355,770
[45] Date of Patent: Oct. 18, 1994

[54] BRAKE BOOSTER

[75] Inventors: Jean Pierre Gautier; Ulysse Verbo, both of Aulnay-sous-Bois; Miguel Perez Revilla, Argenteuil; Guy Meynier, Aulnay-sous-Bois; Philippe Castel, Paris, all of France

[73] Assignee: AlliedSignal Europe Services Techniques, Drancy, France

[21] Appl. No.: 50,203
[22] PCT Filed: Nov. 26, 1992
[86] PCT No.: PCT/FR92/01100
 § 371 Date: May 4, 1993
 § 102(e) Date: May 4, 1993
[87] PCT Pub. No.: WO93/11011
 PCT Pub. Date: Jun. 10, 1993

[30] Foreign Application Priority Data
 Dec. 6, 1991 [FR] France ................... 91 15130
[51] Int. Cl.⁵ ............... F15B 9/10; B60T 13/567
[52] U.S. Cl. .................... 91/376; 92/98 D
[58] Field of Search ........... 92/48, 98 D, 98 R, 96; 91/376 R, 369.2

[56] References Cited
U.S. PATENT DOCUMENTS
4,330,996 5/1982 Becht et al. ................. 92/48 X
4,339,992 7/1982 Schanz ...................... 92/98 D X
4,418,611 12/1983 Tateoka et al. ............... 82/98 D X
5,090,298 2/1992 Gautier et al. ................ 92/96 X FOREIGN PATENT DOCUMENTS
331535 9/1989 European Pat. Off. .
2406551 5/1979 France .
2432412 2/1980 France .

Primary Examiner—Edward K. Look
Assistant Examiner—John Ryznic
Attorney, Agent, or Firm—Larry J. Palguta

[57] ABSTRACT

The invention relates to a brake-booster comprising a casing (10) within which is found a piston structure which, with the help of an unrolling membrane (12), defines a front chamber (16) permanently connected to a partial vacuum source by a valve (17) and a back chamber (16) selectively connected to the front chamber (16) or to the atmosphere via a valve means (34) when a control rod (30) is actuated, and a device (36) for fastening the booster on a wall (38) adjacent to a first face of the casing (10). According to the invention, apertures (50, 60) are made in the piston structure (14) and in a second face of the casing (10) and are aligned in the axial direction of the booster so as to permit the actuation of the fastening device (36) through the aperture (60) made in the second face of the casing (10).

14 Claims, 5 Drawing Sheets

BRAKE BOOSTER

The present invention relates to pneumatic boosters, more particularly of the type of those which are used in order to provide assistance to the braking of motor vehicles.

Boosters of this type comprise in a conventional manner a casing within which is found at least one piston structure which, with the help of an unrolling membrane, defines at least one front chamber permanently connected to a partial vacuum source and at least one back chamber connected selectively to the front chamber or to the atmosphere via a valve means when a control rod is actuated, and a device for fastening the booster on a wall adjacent to a first face of the casing.

The booster is mounted, as a general rule, on the apron of the engine compartment of the vehicle by mounting screws which are fastened on the back part of the casing on the apron side. It is therefore necessary to tighten nuts onto the mounting screws on the vehicle passenger compartment side. This operation presents disadvantages for the manufacturers during the production of the vehicle, because it requires the execution of operations simultaneously on the engine compartment side and on the passenger compartment side.

The object of the present invention is therefore to provide a brake-booster which permits mounting thereof in a vehicle by working solely on the side of the wall where the booster is mounted.

According to the invention, this result is obtained by making apertures in the piston structure and in a second face of the casing, these apertures being aligned in the axial direction of the booster so as to permit the actuation of the fastening device through the aperture made in the second face of the casing, the aperture made in the piston structure receiving a closing member.

The invention will now be described by way of example with reference to the accompanying drawings in which.

Figure 2:
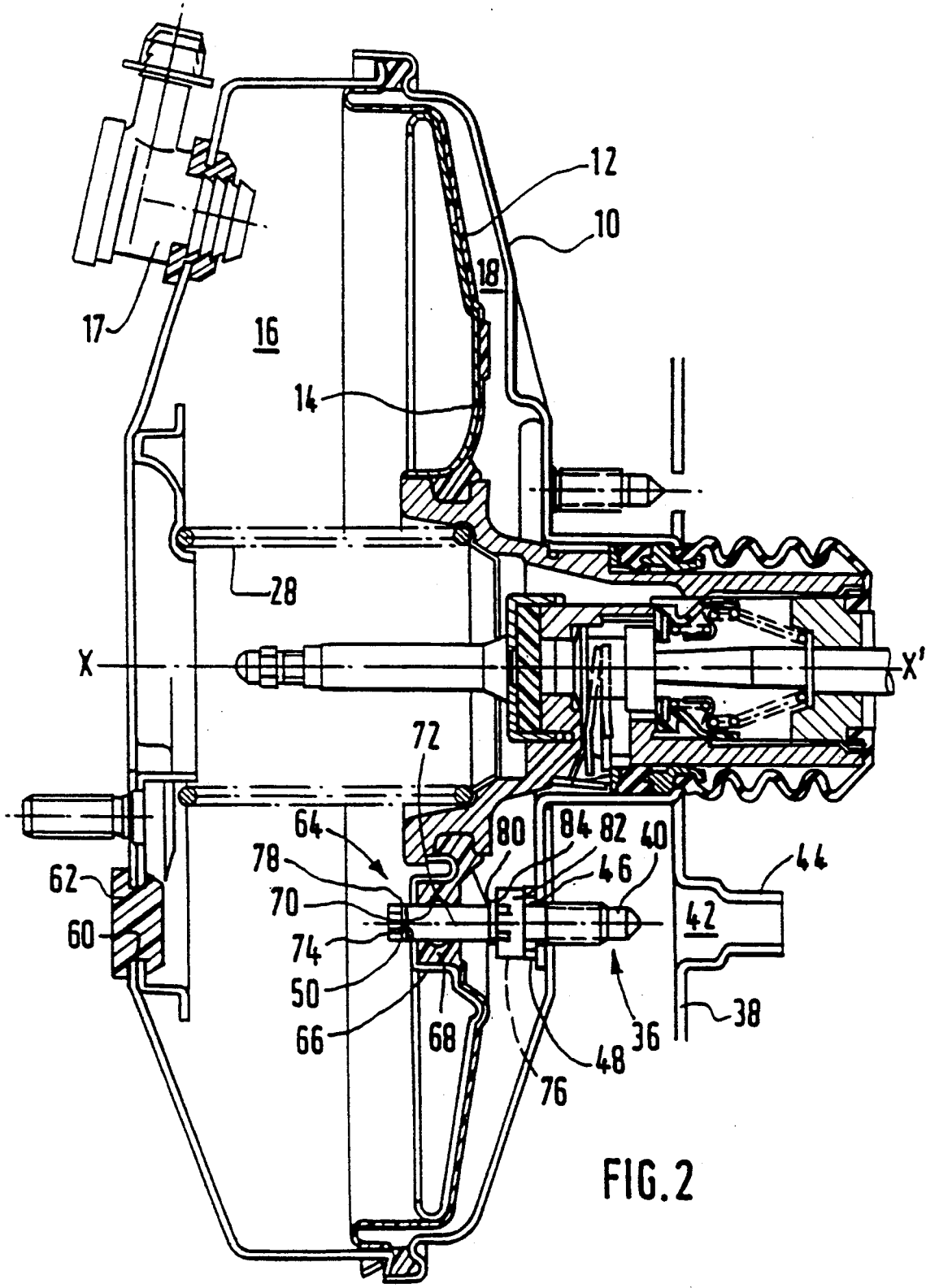
FIG. 2 is a view similar to that of FIG. 1 and shows in its lower half a second embodiment of the invention.
Figure 3:
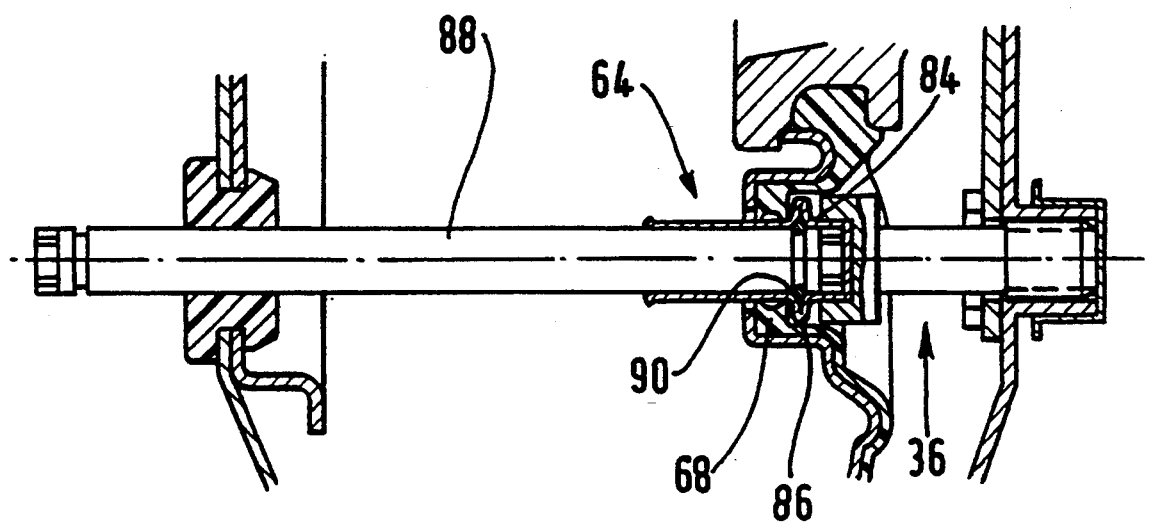

FIG. 3 gives a partial view of a variant of FIG. 2.

Figure 4:
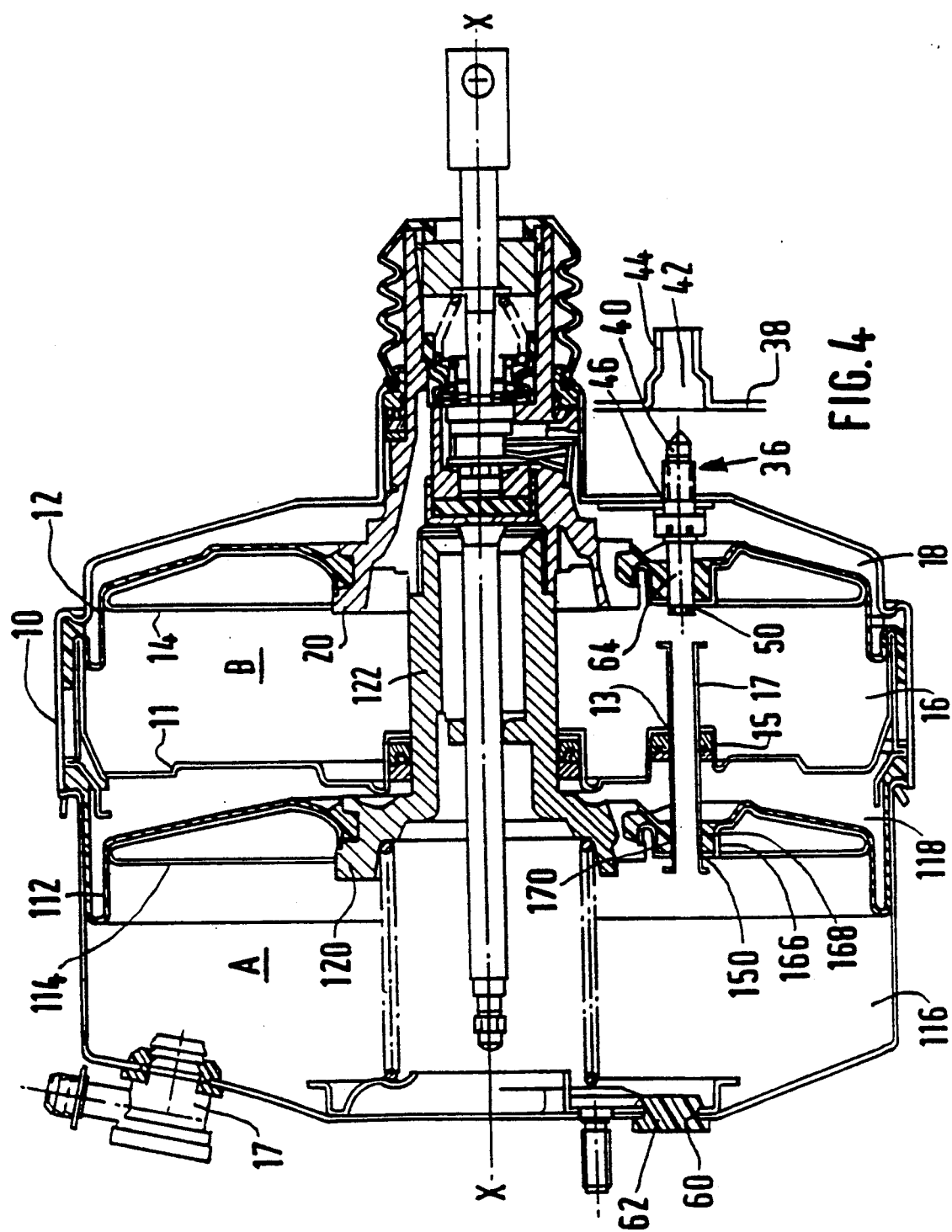
Figure 5:
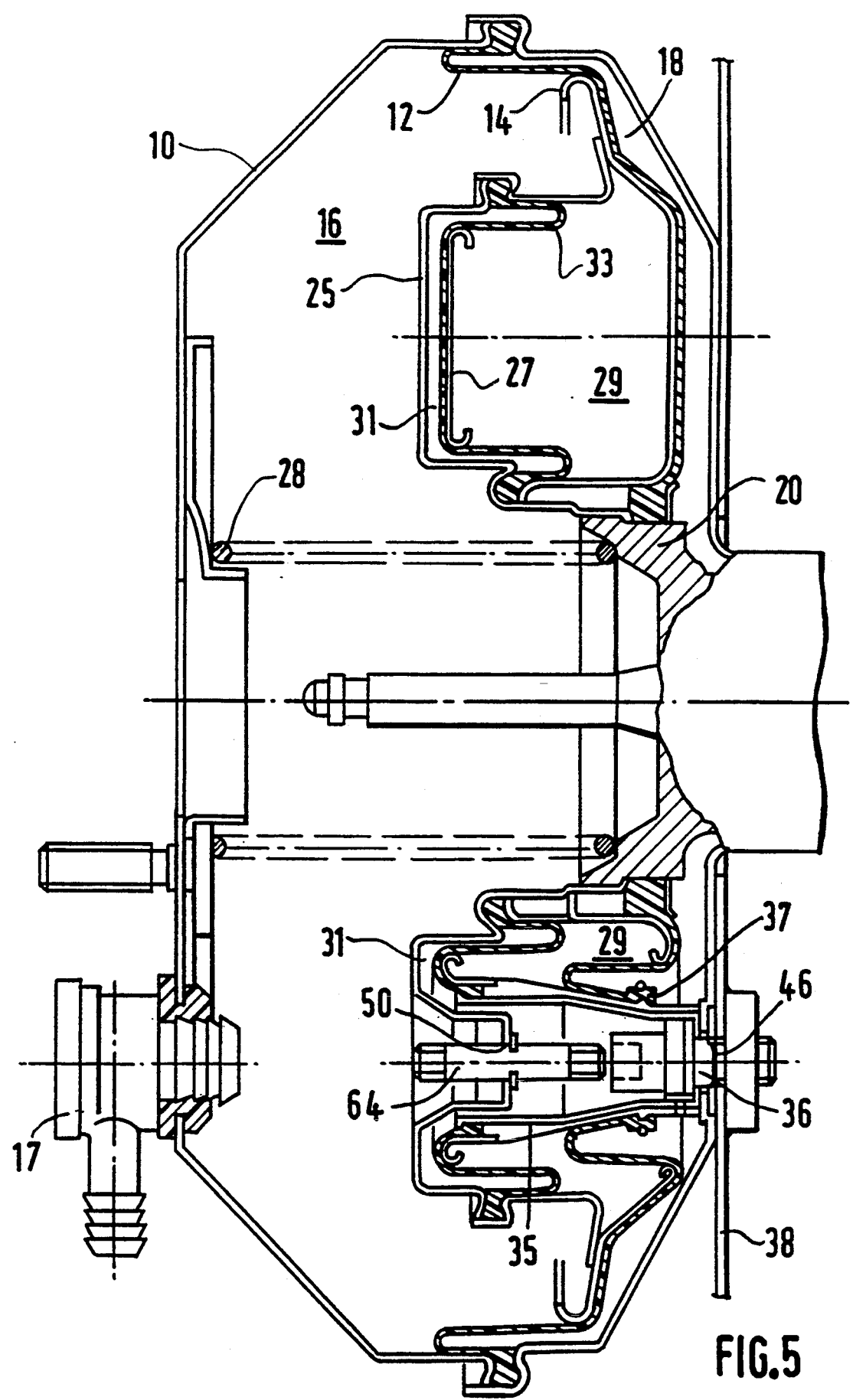

FIG. 4 is a view in longitudinal section of a brake-booster mounted in tandem, produced in accordance with one embodiment of the invention, and FIG. 5 is a view in longitudinal section of a brake-booster with an additional chamber, produced in accordance with one embodiment of the invention.

Figure 1:
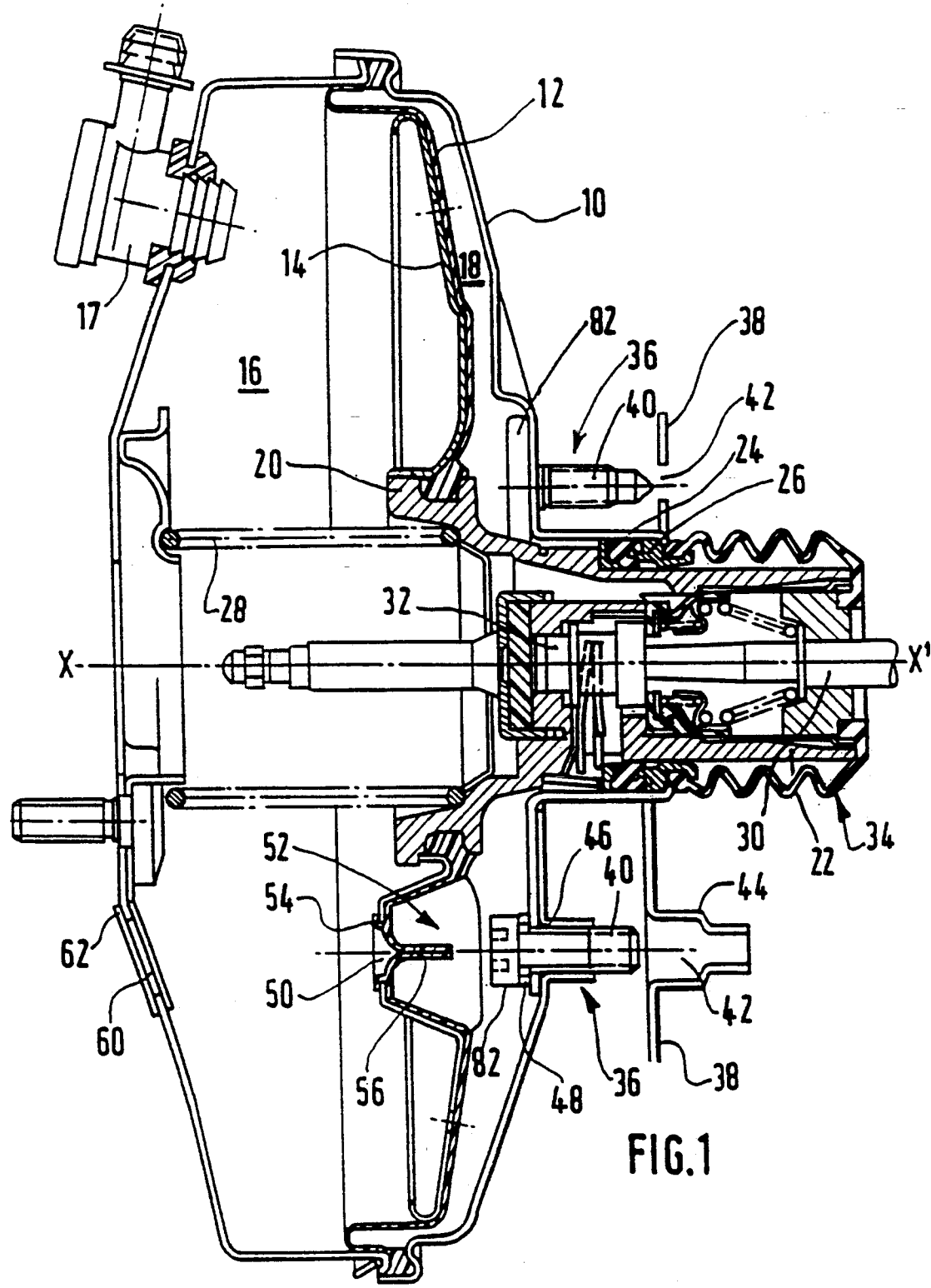
FIG. 1 is a view in longitudinal section of a brake-booster, constructed in conventional manner in the upper half of this Figure and constructed according to a first embodiment of the invention in the lower half of this Figure.

FIG. 1 shows a brake-booster intended to be placed, in a usual manner, between the brake pedal of a vehicle and the master cylinder controlling the hydraulic brake system. By convention, the part of the booster directed towards the master cylinder will be termed "front" and the part of the booster directed towards the brake pedal, "back".

The booster comprises a shell-shaped outer casing 10 presenting substantially a symmetry of revolution about an axis X-X'. A flexible membrane in elastomer 12, reinforced in its central part by a metal disk 14 also termed skirt, defines within the space delimited by the casing 10 a front chamber 16 and a back chamber 18. The front chamber 16 is permanently connected to a partial vacuum source by a vacuum retaining valve 17 disposed in an aperture of the front wall of the casing 10. The outer peripheral edge of the membrane 12 is secured in leaktight manner onto the outer casing 10. The inner peripheral edge of this membrane terminates with a bead received in leaktight manner in an annular groove formed on the outer peripheral surface of a piston hub 20 disposed along the axis X-X' of the booster. This hub 20 extends backwards in the shape of a tubular part 22 which passes in leaktight manner through the back wall of the casing 10. The leaktightness of this passing-through is ensured by a reinforced annular seal 24 which is fastened by a ring 26 in a tubular central part extending backwards the back wall of the casing 10.

A compression spring 28 interposed between the skirt 14 and the front wall of the outer casing 10 normally retains the skirt 14 in a rear rest position shown in FIG. 1, in which the back chamber 18 occupies its minimal volume and the front chamber 16 its maximal volume.

In a known manner, the tubular part 22 of the hub 20 receives a control rod 30 intended to be connected to the brake pedal (not shown). The other end of the rod 30 comprises a plunger 32 which is intended, during operation of the booster, to actuate a conventional valve means 34 which controls in a known manner the passage of air to the back chamber 18 or from the back chamber 18 to the front chamber 16.

The booster further comprises, as shown in the upper half of FIG. 1, devices 36 for fastening on a wall 38 of the vehicle, such for example as the apron separating the passenger compartment from the engine compartment. The fastening devices 36 are conventionally constituted by screws the head 82 of each of which is situated in the back chamber 18 and the shank 40 of each of which is crimped, at its end close to the head 82, into the casing 10. Thus, during the mounting on the vehicle, the booster is presented on the apron through the engine compartment so that the shanks 40 enter the apertures 42 of the apron, and then, through the passenger compartment, a nut is screwed onto the thread of the screw 36, with the well-known attendant difficulties for the operator who cannot be simultaneously inside and outside the passenger compartment of the vehicle, the access to the fastening zone of the assembly, on the passenger compartment side, being moreover extremely difficult.

The present invention has precisely the object of obviating these disadvantages by providing a booster greatly facilitating the operations of mounting and of removal and in particular enabling the operator to carry out all of the operations of mounting or of removal, while remaining solely on the side of the wall of the vehicle where the braking assembly is installed.

In order to do this, as shown in the lower half of FIG. 1, the aperture 42 in the apron 38 is shaped so as to be capable of cooperating with the thread of a screw. As shown, the apron 38 may be formed so as to present around the aperture 42 a tubular part 44 extending backwards into the passenger compartment and possessing an inner tapping. As a variant, provision may be made for a nut to be made integral with the apron 38.

The fastening device 36 is constituted by a screw the head 82 of which is situated in the back chamber 18 and the shank 40 of which passes through an aperture 46 made in the back face of the casing 10. The screw 36 is received in the aperture 46 so as to be free in rotation in this aperture, but is imprisoned by it, that is to say that it cannot be extracted from it, in the manner of captive screws.

An aperture 50 is made in the piston structure, and more precisely in the skirt 14, so that this aperture 50 is aligned in the axial direction with the aperture 46 and the screw 36 and a closing member is disposed in this aperture. For example, at this place on the skirt, the unrolling membrane 12 is shaped so as to form a valve 52. In the example shown, the membrane 12 comprises a flange 54 in order to anchor the membrane onto the skirt 14, and, extending from this flange 54, a tubular part 56 extending backwards, and whose back edges normally remain flattened against one another. Such a design is known by the name duckbill valve. The skirt 15 may advantageously be shaped in this place with a projection in order to facilitate the functioning of the valve 52.

Lastly, an aperture 60 is made in the front wall of the casing 10, so as to be aligned in the axial direction with the aperture 50 comprising the valve 52 and the aperture 46 containing the screw 36.

From the preceding explanations, it will have been understood how the booster can be installed on the apron of the vehicle. The booster is presented onto the apron 38 through the engine compartment so that the shanks 40 of the screws 36 fit into the apertures 42 of the apron 38. Owing to their design, they remain imprisoned by the apertures 46 of the casing 10, and come to rest against the tubular part 44, or the nut, disposed behind the aperture 42. At that moment, the operator inserts through the aperture 60 in the front wall of the booster a tightening tool the head of which entering the booster has a shape complementary to that of the head of the screw 36. In the example shown, the head 82 of the screw 36 is shaped with a blind recess, for example in the form of a hollow hexagon. In continuing its insertion, the head of the tool will encounter the valve 52 and separate the edges of the tubular part 56 so as to arrive at the head 82 of the screw 36. It is then sufficient for the operator to turn the tool so as to screw the screw 36 into the part 44 of the apron 38, or into the nut integral with the apron. Once the screw has been put into place and tightened with the required tightening torque, the operator can withdraw the tool from the booster. During this withdrawal, the tool slides along the tubular part 56 of the membrane 12 and, as the head of the tool passes progressively through this tubular part, the edges of this part come together and resume the position shown in FIG. 1.

When the tool is completely removed from the booster, the aperture 60 in the front wall can then be closed off so as to render the booster operational. Provision may be made to dispose a plug 62 in this aperture, as shown. Provision may also be made to close off the aperture 60 by means of the vacuum retaining valve 17 which will then be disposed in this place rather than in the position shown. Provision may also be made for the closing-off of the aperture 60 to be effected by the flange for mounting a master cylinder (not shown) on the front face of the booster. The same operation is repeated with the other fastening screw or screws of the booster (generally two in number) so as to complete the installation of the booster.

It can therefore be clearly seen that, according to the invention, a booster has been constructed the entire installation of which is carried out by working solely from the side of the wall where the booster is installed. This therefore results in a mounting and a removal of the booster which are particularly easy, even capable of being automated by means of industrial robots.

FIG. 2 shows an example of a second embodiment of the invention. In this Figure, the same members as those of FIG. 1 bear the same reference numbers. According to this embodiment, the aperture 46 cooperating with the screw 36 in the back wall, and the aperture 60 and the plug 62 in the front wall, are identical to those of the preceding embodiment.

The aperture 50 in the skirt 14 receives a closing member in the form of an intermediate member 64. In a more precise manner, the aperture 50 is formed at the top of a projection 66 of the skirt 14 the convexity of which is turned forwards. The membrane 12 is shaped with a bead 68 fitting the concave shape of the projection 66 and delimiting an aperture 70 coaxial with the aperture 50. In this aperture 70 is received in leaktight manner the cylindrical central part 72 of the intermediate member 64.

The front part 74 of the intermediate member is situated in the front chamber 16 of the booster and is shaped like a nut, being for example hexagonal. The back part 76 of the intermediate member is situated in the back chamber 18 of the booster and is also shaped like a nut, being for example hexagonal, of shape complementary to that of the blind recess of the head 82 of the screw 36, for example in the form of a hollow hexagon. Between the front part 74 and the central part 72 is formed a groove 78, and between the central part 72 and the back part 76 is formed a swelling defining a front step 80 and a back step 84.

The installation on the vehicle of the booster according to this embodiment is completely similar to that which was previously described. Once the booster is ready, that is to say once the shanks 40 of the screws 36 are engaged in the apertures 42 of the apron 38, the operator inserts through the aperture 60 a tool whose head entering the booster has a shape complementary to that of the front part 74 of the intermediate member 64. The tool then causes the intermediate member 64 to move backwards if it was in forward position, and the back part 76 of the intermediate member comes to fit into the head 82 of the screw 36 until the step 84 comes to be stopped against the head 82.

The operator then has only to turn the tool in order to screw the screw 36, by means of the intermediate member 64, into the tubular part 44 of the apron 38, or into the nut integral with the apron. Once the screw is put into place and tightened with the required tightening torque, the operator can withdraw the tool from the booster. At the start of this phase of withdrawal of the tool, the latter, which comprises means cooperating with the groove 78, carries along with it towards the front the intermediate member 64 until the front step 80 comes to be stopped against the bead 68 of the membrane 12. The means of the tool which cooperate with the groove 78 are then retracted manually or automatically when a threshold of tractive effort is exceeded, and the head of the tool can then be disengaged from the front part 74 of the intermediate member 64 and extracted from the booster.

During the movement of withdrawal of the tool, it will be seen therefore that the back part 76 of the intermediate member 64 has been disengaged from the head 82 of the screw 36. This has the object of preventing slight eccentricities of the intermediate member 64, due to the movements of the skirt 14 during successive actuations of the booster, with respect to the head of the screw 36, from creating interferences between these two parts which would disturb the return to the rear rest position of the piston structure.

The aperture 60 in the front wall of the casing can then be closed off as previously with a plug 62, a vacuum retaining valve 17 or the flange for mounting a master cylinder on the booster.

Here again, it can be seen that a booster has been constructed the entire installation of which is carried out by working solely from the side of the wall where the booster is installed.

A variant of the embodiment according to FIG. 2 is shown in FIG. 3, where the intermediate member 64 is seen to be constituted by a blind tube of which the part 84 situated in the direction of the screw 36 is on the outside in the form of a hexagon complementary to the hollow hexagonal shape of the head 82 of the screw 36, and on the inside in the form of a hollow hexagon.

The tube 64 also comprises a fold 86, forming a flange on the outside, and a groove on the inside. The tightening tool 88 itself comprises at its end entering the booster a retractable retaining ring 90 and a hexagonal shape cooperating with the hollow hexagonal shape of the bottom of the tube 64. This tool, once inserted into the booster, has its hexagon cooperating with that of the screw 36, through the tube 64, and its retaining ring 90 clipped into the groove of the fold 86.

When the tightening of the screw 36 is completed, the tool 88 is withdrawn, and in this movement effects the withdrawal towards the front of the tube 64, by means of the retaining ring 90, until the flange of the fold 86 bears against the bead 68. The tool is then withdrawn completely, owing to the retraction of the retaining ring 90, and the aperture 60 plugged as previously.

The invention also applies to double or tandem-mounted pneumatic boosters as have been represented in FIG. 4. Such a booster conventionally comprises an outer casing 10, whose inside is divided by a fixed partition 11 into a front volume A and a back volume B. The back volume B comprises the same elements as those which have been described with reference to FIG. 2 and which bear the same reference numerals. The front volume A comprises elements similar to those which were described with reference to FIG. 2, and which bear the same reference numerals increased by 100. With these conventions, it is seen that the front volume A is divided into a front chamber 116 and a back chamber 118 by a flexible membrane 112 reinforced in its central part by a metal disc 114 also called a skirt.

The front chamber 116 is permanently connected to a vacuum source via a vacuum-retaining valve 17 arranged in an aperture of the front wall of the casing 10. The outer peripheral edge of the membrane 112 is fixed in leaktight manner to the outer casing 10. The inner peripheral edge of this membrane ends in a bead received in leaktight manner in an annular groove formed on the outer peripheral surface of a piston hub 120 disposed along the axis X-X' of the booster.

This hub 120 extends backward in the shape of a tubular part 122 which passes in leaktight manner through the fixed partition 11. The tubular part 122 of the hub 120 is secured, for example by screwing, to the hub 20. The two skirts 14 and 114 are thus secured, and the compression spring 28 interposed between the skirt 114 and the front wall of the outer casing 10 normally maintains the skirts 14 and 114 in a rear rest position illustrated in FIG. 4, in which the back chambers 18 and 118 occupy their minimum volume and the front chambers 16 and 116 occupy their maximum volume.

As in the embodiments described previously, the apron 38 is shaped so as to be able to interact with the thread of a screw 36 trapped in the aperture 46 made in the back face of the casing 10. The skirt 14 is formed with the aperture 50 closed off by the intermediate member 64.

In the same way, the skirt 114 is formed with a boss 166 whose convexity is turned forwards, and at the top of which there is formed an aperture 150. The membrane 112 is formed with a bead 168 matching the concave shape of the boss 166 and delimiting an aperture 170 coaxial with the apertures 50 and 150.

The fixed partition 11 is formed with an aperture 13 coaxial with the apertures 50 and 150 and equipped with a seal 15. A tube 17 slides in leaktight manner in the apertures 150 and 13, and has a length slightly greater than the maximum travel of the skirts 14 and 114.

The installation of the booster of FIG. 4 in the vehicle emerges clearly from the preceding description. Once the booster is ready, that is to say once the shanks of the screw 36 are engaged in the apertures 42 of the apron 38, the operator introduces through the aperture 60 a tool whose head penetrating the booster has a shape complementary to that of the front part of the intermediate member 64. The tool passes through the tube 17 and is engaged in the head of the screw 36, which it then suffices to screw.

The operator may withdraw the tool as previously and close off the aperture 60.

The front and back edges of the tube 17 may advantageously be folded over to ensure that the latter does not lose contact with the apertures 13 and 150. Of course, a valve 52 or a blind tube may be used in place of the intermediate member 64. One additional advantage of this embodiment resides in the fact that, once the tandem booster is installed in the vehicle, the tube 17 provides the communication between the front chambers 16 and 116 of the front and back volumes A and B.

The invention may also be applied to boosters with an additional chamber, for example of the type described in the document U.S. Pat. No. 5,044,255 to which reference may be made and which is represented in FIG. 5.

According to this type of booster, an auxiliary annular housing 25 is fastened to the skirt 14 and projects into the front chamber 16.

An annular piston 27 internally divides this auxiliary housing 25 into two chambers 29 and 31 in sealed manner by virtue of an auxiliary membrane 33. The annular piston 27 is mounted fixed with respect to the casing 10. More precisely, in order to implement the present invention, the annular piston 27 is formed with an extension of overall cylindrical shape 35 extending backward, fixed to the back wall of the casing 10, around the aperture 46 receiving the screw 36. The unrolling membrane 12 is formed with an aperture whose periphery 37 is fastened in leaktight manner around the cylindrical extension 35 to provide sealing between the back chamber 18 and the chamber 29 of the housing 25.

Coaxially to the cylindrical extension 35, the skirt 14 is formed with an aperture 50 receiving, as has been shown, an intermediate member 64, a valve 52 or a blind tube as in the preceding embodiments. The booster with an additional chamber may thus be mounted as already explained previously.

Of course, the invention is not limited to the embodiments which have been described by way of example, but is capable of receiving numerous variants which will be apparent to a person skilled in the art. It is in this manner for example that, for some applications where the booster is required to be installed in the passenger compartment of the vehicle, the invention is applied by disposing the fastening device on the front wall of the booster and the aperture 60 on the back wall of the booster. In these cases, the embodiment of FIG. 2 will be preferred and the installation will be carried out with the compression spring 28 having been completely compressed so that the piston structure occupies its extreme forward position. Moreover, the tightening tool 88 may be pre-installed in the booster, as shown in FIG. 3, so that, when installing the booster on the vehicle, the operator will have only to operate the tightening tool in rotation and to withdraw it once the tightening has been carried out. This arrangement thus spares the operator from inserting the tool into the booster, searching for the alignment and the precise positioning of the tightening tool with respect to the intermediate member 64. Similarly, the valve of the embodiment of FIG. 1 may be constructed with the help of a rigid insert buried in the membrane so as to form a rocking closing device, coming normally to plug the aperture made in the skirt owing to the resilience of the material constituting the membrane, and opening by rotation about one of its sides under the effect of the external force caused by the introduction of the tightening tool into the booster.

We claim:

1. A brake booster comprising a casing (10) within which is at least one piston structure which, with the help of an unrolling membrane (12), defines at least one front chamber (16) connected permanently to a vacuum source via a valve (17) and at least one back chamber (18) connected selectively to the front chamber (16) or to atmosphere via valve means (34) when a control rod (30) is actuated, and a fastening device (36) for fastening the booster on a wall (38) adjacent to a first face of the casing (10), apertures (50, 60) located in a piston structure (14) and in a second face of the casing (10) and aligned in an axial direction of the booster so as to permit the actuation of the fastening device (36) through the aperture (60) in the second face of the casing (10), characterized in that the aperture (50) in the piston structure (14) receives a closing member (52, 64) integral with the piston structure and movable with the piston structure.

2. Booster according to claim 1, characterized in that the fastening device (36) is a screw (36) received in an aperture (46) of the first face of the casing (10) so as to be free in rotation in this aperture (46) and to be imprisoned by this aperture (46).

3. Booster according to claim 2, characterized in that the screw (36) comprises a head having a shape complementary to that of a tightening tool.

4. Booster according to claim 3, characterized in that the closing member is a valve (52).

5. Booster according to claim 4, characterized in that the valve (52) is formed by a tubular part (56) of the unrolling membrane (12) whose edges remote from the piston structure (14) normally remain flattened against one another.

6. Booster according to claim 3, characterized in that the closing member is an intermediate member (64) received in leaktight manner in an aperture (70) of the piston structure (14).

7. Booster according to claim 6, characterized in that the intermediate member (64) comprises a first end part (74) having a shape complementary to that of the head of the tightening tool and a second end part (76) having a shape complementary to that of the head (82) and of the screw (36).

8. Booster according to claim 6, characterized in that the intermediate member (64) is constituted by a blind tube a part (84) of which situated in the direction of the screw (36) has a shape complementary to the shape of the head (82) of the screw (36).

9. Booster according to claim 8, characterized in that the tube (64) comprises a fold (86) forming an outer flange and an inner groove.

10. Booster according to claim 9, characterized in that a retaining ring (90) is resiliently mounted on the tightening tool (88) and is received in the inner groove of the tube (64).

11. Booster according to claim 1, characterized in that an auxiliary housing (25) is secured to the piston structure (14) and projects into the front chamber (16), an auxiliary piston (27) internally dividing the auxiliary housing (25) in leaktight manner into two chambers (29, 31) by virtue of an auxiliary membrane (33), the auxiliary piston (27) being mounted fixed with respect to the casing (10) by means of at least one cylindrical extension (35) extending backward and fastened to the casing (10) around the fastening means (36), the cylindrical extension (35) being coaxial with the aperture (50) made in the piston structure (14).

12. Booster according to claim 1, additionally comprising a fixed partition (1) delimiting, inside the casing (10), a front volume (A) and a back volume (B), the front volume being divided in leaktight manner into a front chamber (116) and a back chamber (118) by a second piston structure (114) secured to the piston structure (14) of the back volume (B) by means of a tubular part (122) which traverses, in leaktight manner, the fixed partition (11), characterized in that apertures (13, 150) are in the fixed partition (11) and in the second piston structure (114), aligned in the axial direction of the booster with the apertures (50, 60) made in the piston structure (14) of the back volume (B) and in the second face of the casing (10) and receiving a tube (17) with leaktight sliding.

13. Booster according to any one of the preceding claims, characterized in that the aperture (60) made in the second face of the casing (10) is closed off by a plug (62).

14. Booster according to any one of claims 2 to 12 and 1, characterized in that the aperture (60) made in the second face of the casing (10) is closed off by the valve (17).

* * * * *